United States Patent
Yang et al.

(10) Patent No.: US 8,802,765 B2
(45) Date of Patent: Aug. 12, 2014

(54) AQUEOUS COPOLYMER DISPERSION AND COATING COMPOSITION

(75) Inventors: Huiling Yang, Shanghai (CN); Xiangting Dong, Shanghai (CN); Siyuan Jiang, Shanghai (CN); Qianqian Li, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 162 days.

(21) Appl. No.: 13/076,508

(22) Filed: Mar. 31, 2011

(65) Prior Publication Data

US 2011/0245390 A1 Oct. 6, 2011

(51) Int. Cl.
| | |
|---|---|
| *C08K 5/07* | (2006.01) |
| *C08K 5/18* | (2006.01) |
| *C09D 133/12* | (2006.01) |
| *C08F 2/22* | (2006.01) |
| *C08F 2/18* | (2006.01) |
| *C08F 2/16* | (2006.01) |

(52) U.S. Cl.
USPC ........... 524/458; 524/241; 524/359; 524/292; 524/290; 524/259; 521/54; 521/134; 521/139; 521/142; 523/200; 523/201

(58) Field of Classification Search
CPC .......... C08K 5/07; C08K 5/18; C09D 133/12; C08F 2/22; C08F 2/18; C08F 2/16
USPC ................. 524/458, 359, 241, 292, 290, 259; 521/54, 134, 139, 142; 523/200, 201
See application file for complete search history.

(56) References Cited

U.S. PATENT DOCUMENTS

| | | |
|---|---|---|
| 4,080,275 A | 3/1978 | Photis |
| 4,999,218 A | 3/1991 | Rehmer et al. |
| 5,314,936 A | 5/1994 | Schwartz et al. |
| 6,060,532 A | 5/2000 | Frankel |
| 6,303,188 B1 | 10/2001 | Bors |
| 6,376,570 B1 * | 4/2002 | Zhao et al. ............... 522/42 |
| 2006/0100298 A1 * | 5/2006 | Ulrich et al. .............. 522/26 |
| 2007/0255000 A1 * | 11/2007 | Bardman et al. .......... 524/458 |

FOREIGN PATENT DOCUMENTS

DE 4318083 A1 5/1994

OTHER PUBLICATIONS

European Search Report issued in EP 11 15 8977, dated Jun. 9, 2011.

* cited by examiner

*Primary Examiner* — James J Seidleck
*Assistant Examiner* — Deve E Valdez
(74) *Attorney, Agent, or Firm* — Karl E. Stauss; Cantor Colburn LLP

(57) ABSTRACT

The present invention relates to an aqueous copolymer dispersion comprising an emulsion copolymer and two hydrophobic aromatic ketones, wherein the aromatic ketones are, based on the dry weight of the copolymer, from 0.1 to 3 wt % benzophenone and from 0.1 to 4 wt % a benzophenone derivative; wherein the dispersion comprises 0 or less than 0.1 wt % hydrophilic aromatic ketone. The copolymer dispersion is suitable for preparation of aqueous coating compositions which yields a relatively hard surface to provide not only short term but also long term dirt pick up resistance effects, after exposure to ultraviolet radiation.

15 Claims, No Drawings

AQUEOUS COPOLYMER DISPERSION AND COATING COMPOSITION

BACKGROUND

This patent application claims the benefit of the earlier filed Chinese Patent Application serial number 201010158668.0 filed on Mar. 31, 2010.

This invention relates generally to an aqueous copolymer dispersion for the preparation of coatings, especially for elastomeric coatings or exterior coatings, which after exposure to ultraviolet radiation, yields a relatively hard surface to improve dirt pick up resistance (DPUR) from early stage to long term exposure.

By "dirt pick up resistance" herein is meant that is the ability to minimize the accumulation of material such as dirt, dust, and soot onto the surface of the coating. DPUR is a general recognized desirable characteristic of a coating film. Coatings with poor DPUR are characterized as having an unclean and darkened appearance.

Benzophenone is known to be effective at improving the early DPUR of paint films made with soft polymers, but it is less effective for improving long term DPUR. It is also easy to cause surface cracking as a result of over crosslinking the film surface when the dosing level is relatively high. And the nature of Benzophenone requires that films containing this material be exposed to UV relatively quickly, or it will not result in the full effect.

Patent application DE 4318083 provides aqueous polymer dispersions containing a mixture of hydrophilic and hydrophobic aromatic ketones, which enable the coating systems with increased UV sensitivity with a low tendency to soiling. The advantage of this invention was contributed by a combination of both hydrophilic (component B) and hydrophobic (component C) aromatic ketones. However, comprehensive properties of the dry film surface including long term exposure performance, exterior exposure performance and color retention performance in the absence of hydrophilic aromatic ketones are still desired.

STATEMENT OF INVENTION

The present invention provides an aqueous copolymer dispersion comprising an emulsion copolymer and two hydrophobic aromatic ketones, wherein the aromatic ketones are, based on the dry weight of the copolymer, from 0.1 to 3 wt % benzophenone and from 0.1 to 4 wt % a benzophenone derivative; wherein the dispersion comprises 0 or less than 0.1 wt % hydrophilic aromatic ketone.

The present invention further provides an aqueous coating composition comprising an emulsion copolymer, two hydrophobic aromatic ketones and a coating adjuvant, wherein the aromatic ketones are, based on the dry weight of the copolymer, from 0.1 to 3 wt % benzophenone and from 0.1 to 4 wt % a benzophenone derivative; wherein the coating composition comprises 0 or less than 0.1 wt % hydrophilic aromatic ketone.

DETAILED DESCRIPTION

The present invention overcomes the disadvantages of the coatings of the state of the art by providing, as the core of the present invention, an aqueous copolymer dispersion for coating formulations with improved short term and long term DPUR effect while maintaining the mechanical property and durability for the aqueous coating compositions. Besides, a DPUR aqueous coating composition is also provided.

The first aspect of the present invention is an aqueous copolymer dispersion comprising from 0.1% to 3% benzophenone and from 0.1% to 4% a benzophenone derivative, wherein the derivative is hydrophobic.

By "hydrophobic" herein refers to the tendency of a substance to repel water or to be incapable of completely dissolving in water. Hydrophobic aromatic ketones, such as benzophenone, are readily soluble in many nonpolar solvents, such as octanol, but only sparingly soluble in water, a polar solvent.

The derivative is characterized by following formula:

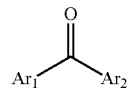

wherein each of $Ar_1$ and $Ar_2$ is selected from mono-, di- or tri-substituted phenyl; each of the substituted groups is selected from $C_2$-$C_{12}$ alkyl, OR, COOR, vinyl, allyl, $NR'_2$, $NO_2$, CN and SR';
wherein R is selected from H, $C_1$-$C_{12}$ alkyl, allyl and vinyl groups; R' is selected from H, $C_1$-$C_{12}$ alkyl and alkyl groups; the allyl and vinyl are $C_1$-$C_{12}$; and the aryl group is selected from substituted phenyl and naphthyl.

The derivatives contribute to long term DPUR effect in combination with benzophenone due to their larger molecules than benzophenone, which causes a slower migration from internal of the coating film to the surface and thus ensure a hard DPUR surface over time. When merely use benzophenone, it is intended to add a relative high level to minimize the loss of DPUR effect caused by volatilization of benzophenone. As a result of high dosing level of the photoinitiator, the film surface is over cross-linked and easy to crack. The benzophenone derivatives can effective lower the benzophenone's dosage requirement. Therefore, any of the benzophenone derivatives having larger molecule than benzophenone and slower migration in the film is contemplated to be suitable for the present invention. Examples of the benzophenone derivatives include, as described by above formula, wherein one or both of the phenyl rings may be substituted such as, for example, methyl-2-benzoylbenzoate, 4-hydroxy benzophenone, 4-amino benzophenone, 4-hydrocarboxyl benzophenone, 4-carboxymethyl benzophenone and 3-nitro benzophenone. In one embodiment, the derivative is methyl-2-benzoylbenzoate.

In another embodiment, the benzophenone in the aqueous copolymer dispersion has the level of from 0.1% to 3%, preferably from 0.6% to 3%, more preferably from 0.6% to 2%, in weight percentage based on the dry weight of the copolymer dispersion. The benzophenone derivative has the level from 0.1% to 4%, preferably from 0.5% to 3%, in particular from 1% to 3%.

In yet another embodiment, the aqueous copolymer dispersion comprises from 0.1 to 3 wt % benzophenone and from 0.1 to 4 wt % methyl-2-benzoylbenzoate.

In yet another embodiment, the aqueous copolymer dispersion comprises from 0.6% to 2% benzophenone and from 1% to 3% methyl-2-benzoylbenzoate.

The aqueous copolymer dispersion of the present invention comprises 0 or less than 0.1 wt % hydrophilic aromatic ketone. By "hydrophilic" herein refers to the tendency of a substance having an affinity for water; readily absorbing or dissolving in water. Hydrophilic aromatic ketones such as, for example, the preferred components B disclosed in page 5-6 of DE 4318083A1, are readily soluble in polar solvents, such as water. In a preferable embodiment, the copolymer dispersion comprises trace amount or does not comprise hydrophilic aromatic ketone.

Each of the aromatic ketones may be added during the copolymerization process, to the copolymer dispersion or post copolymerization such as during coating preparation process.

It is contemplated that one or more of the aromatic ketones have ethylenically unsaturated functional groups. Within the components of the copolymer dispersion mentioned above, any polymerizable aromatic ketone is referred herein in the category of aforementioned "aromatic ketone". For example, an ethylenically unsaturated aromatic ketone shall belong to the component of aromatic ketone. The polymerizable aromatic ketones may be added during the copolymerization process of the emulsion copolymer. For example, the copolymer containing, as a copolymerized unit, ethylenically unsaturated aromatic ketone which may then be reacted, as is well known in the art, to form, for example, the copolymerized units derived from one or more of the following monomers: vinylbenzyl methylbenzoylbenzoate, hydroxymethacryloxypropyl benzoylbenzoate, hydroxymethacryloxypropyl benzoylbenzoate and hydroxymethacryloxypropoxy benzophenone which were disclosed in U.S. Pat. No. 6,060,532.

The aqueous copolymer dispersion of the present invention comprises an emulsion copolymer. The emulsion copolymer comprises, as copolymerized units, in percentage by weight based on the dry weight of the copolymer:

a) at least 90% an ethylenically unsaturated nonionic monomer; and b) up to 10% an ethylenically unsaturated stabilizer monomer.

By "nonionic monomer" herein is meant that the copolymerized monomer residue does not bear an ionic charge between pH=1-14. The ethylenically unsaturated nonionic monomers include, for example, (meth)acrylic ester monomers, wherein "(meth)acrylic ester" designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; amino-functional and ureido-functional monomers; monomers carrying alkoxysilane functionality; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

The term "at least" in a percentage range herein means any and all amounts greater than and including the start point of the range through to 100% but not including 100%.

The term "up to" in a percentage range herein means any and all amounts larger than zero and through to and including the end point of the range.

By "stabilizer monomer" herein refers to the copolymerized monomer residue bears an ionic charge between pH=1-14. The stabilizer monomer includes, for example, a,β-monoethylenically unsaturated carboxylic acids of from 3 to 8 carbon atoms, anhydrides and amides. The a,β-monoethylenically unsaturated carboxylic acid monomers include, for example, acrylic acid, methacrylic acid, crotonic acid, itaconic acid, maleic acid and salts or anhydrides thereof, and the amides of these acids, particularly acrylamide and methacrylamide; and the mixtures thereof. The stabilizer monomer further includes sulfur-containing or phosphor-containing acidic monomer.

In one embodiment, the aqueous emulsion copolymer contains up to 5%, preferably up to 3%, more preferably up to 2%, by weight based on the dry weight of the copolymer, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, or divinyl benzene; or the combinations thereof.

Of particular interest is said copolymer whose monomer substituents said nonionic monomer, said stabilizer monomer and others is present in quantities so that a copolymer composed of only these monomers would have a glass transition temperature (Tg) of −70 to +70, preferably from −40 to +30.

"Tg" used herein are those calculated by using the Fox equation (T. G. Fox, Bull. Am. Physics Soc., Volume 1, Issue No. 3, page 123 (1956)). That is, for calculating the Tg of a copolymer of monomers M1 and M2, $$\frac{1}{T_g(calc.)} = \frac{w(M_1)}{T_g(M_1)} + \frac{w(M_2)}{T_g(M_2)},$$

wherein Tg (calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, all temperatures being in K. The glass transition temperatures of homopolymers may be found, for example, in "Polymer Handbook", edited by J. Brandrup and E. H. Immergut, Interscience Publishers.

The polymerization techniques used to prepare the aqueous emulsion-copolymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100 throughout the course of the reaction. Preferred is a reaction temperature between 30 and 95, more preferably between 50 and 90. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion copolymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous emulsion copolymer. A preferred level of chain transfer agent is up to 0.5 mole %, more preferably up to 0.4 mole % and most preferably up to 0.2 mole %, based on the total number of moles of monomer used to form the aqueous emulsion copolymer.

In another embodiment of the present invention the aqueous emulsion copolymer may be prepared by a multistage emulsion polymerization process, in which at least two stages differing in composition are polymerized in sequential fashion. Such a process sometimes results in the formation of at least two mutually incompatible polymer compositions, thereby resulting in the formation of at least two phases within the polymer particles. Such particles are composed of two or more phases of various geometries or morphologies such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of the monomers shall be determined from the overall composition of the emulsion polymer without regard for the number of stages or phases therein. For example, the first stage composition primarily comprises of styrene and the second stage comprises of the composition described by this invention. Furthermore, the core of the polymer particle may be hollow (i.e., air void). The polymerization techniques used to prepare such multistage emulsion polymers are well known in the art such as, for example, U.S. Pat. Nos. 4,325,856; 4,654,397; and 4,814,373.

The average particle diameter of the emulsion copolymer particles is from 50 to 800 nanometers, preferably from 100 to 400 nanometers, as measured by a BI-90 Particle Sizer.

The second aspect of the invention is provided an aqueous coating composition comprising an emulsion copolymer, two hydrophobic aromatic ketones and a coating adjuvant, wherein the ketones are, based on the dry weight of the copolymer, from 0.1% to 3% benzophenone and from 0.1% to 4% a benzophenone derivative; wherein the coating composition comprises 0 or less than 0.1 wt % hydrophilic aromatic ketone In one embodiment, the aromatic ketones herein are benzophenone and one of its derivatives, wherein the benzophenone has the level from 0.1% to 3%, more preferably from 0.6% to 3%, more preferably from 0.6% to 2%, and wherein the benzophenone derivative has the level from 0.5% to 4%, preferably from 0.5% to 3%, more preferably from 1% to 3%, in weight percentage based on the dry weight of the copolymer dispersion.

The benzophenone derivatives herein are the same as those defined in above description of the first aspect of the invention.

The coating composition of the present invention comprises 0 or less than 0.1 wt % hydrophilic aromatic ketone. Surprisingly, the inventors found that, in one embodiment of the present invention, coating films formed from the coating composition which do not contain a hydrophilic photoinitiator show an improved long term DPUR upon exposure to UV as compare to films which contain hydrophilic aromatic ketones, for example, components B in DE4318083.

The aqueous coating composition comprises at least one coating adjuvant. The adjuvant herein refers to components in the coating except for the emulsion copolymer and the aromatic ketones.

The adjuvant may comprise pigment. Examples of suitable pigments include zinc oxide, antimony oxide, zirconium oxide, chromium oxide, iron oxide, lead oxide, zinc sulfide, lithopone, and titanium dioxide such as, for example, anatase and rutile titanium dioxide. It is also contemplated that the aqueous copolymer dispersion optionally contains opaque polymer particles, such as, for example, ROPAQUE™ opaque polymers from Rohm and Haas Company, a wholly owned subsidiary of The Dow Chemical Company.

The adjuvant may comprise at least one extender. Example of suitable extender include calcium carbonate, calcium sulfate, barium sulfate, mica, clay, calcined clay, feldspar, nepheline, syenite, wollastonite, diatomaceous earth, alumina silicates, non-film forming polymer particles having glass transition temperatures above 35° C., aluminum oxide, silica sol and talc.

The adjuvant may comprise colorant. Suitable colorants include inorganic colorant particles and organic colorant particles. Suitable inorganic colorant particles include, for example, iron oxides, chromium oxides, carbon black, and metal effect pigments such as aluminum, copper, copper oxide, bronze, stainless steel, nickel, zinc, and brass. Suitable organic colorant particles include, for example, azo pigments, phthalocyanine pigments, and quinacridone pigments.

Other materials are optionally included in the adjuvants including rheology modifier; coalescents; solvents; biocides; wetting agents; defoamers; dyes; humectants; waxes; surfactants; flatting agents; neutralizers; buffers; free-thaw additives; plasticizers; antifoaming agents; tackifiers; hindered amine light stabilizers; photoabsorbers; dispersants; and antioxidants. The photoabsorbers can combined with the aqueous copolymer dispersion or can be added to the aqueous coating composition subsequently. Suitable levels of photo absorbers include from 0.1% to 7% by weight solids basis of the aqueous copolymer dispersion.

The amount of pigments and extender in the aqueous coating composition vary from a pigment volume concentration (PVC) of 0 to 85% and thereby encompass coatings otherwise described in the art, for example, as clean coatings, flat coating, satin coatings, semi-gloss coatings, gloss coatings, primers, textured coatings, and the like. Preferable PVC is from 10% to 70%, more preferably PVC is from 10% to 60%. The pigment volume concentration is calculated by the following formula:

$$PVC(\%) = \frac{\text{Volumes of Pigment(s)} + \text{Volumes of Extender(s)}}{\text{Total Dry Volumes of Paint}} * 100$$

If the aqueous copolymer dispersion is to be pigmented, at least one pigment is dispersed in the aqueous medium, preferably using high shearing mixing. Alternatively, at least one predispersed pigment is used. In one method, the aqueous copolymer dispersion is added to the pigment dispersion, either simultaneously or sequentially, with mixing under low shear stirring along with other adjuvants as desired, to provide a pigmented aqueous copolymer dispersion. Alternatively, the pigment slurry is prepared in the presence of the aqueous copolymer dispersion.

The solids content of the aqueous coating composition is typically in the range of from 25% to 60% by volume. The viscosity of the aqueous coating composition is typically from 50 KU (Krebs Units) to 140 KU as measured using a Brookfield Digital Viscometer KU-1, the viscosities appropriate for different application methods vary considerably.

The aqueous coating composition above can be used for coating of a substrate, the coating method comprising:

(1) forming an aqueous coating composition described in the second aspect of the invention;
(2) applying said aqueous composition to a substrate; and
(3) exposed to ultraviolet, drying, or allowing to dry, said aqueous composition.

The aqueous coating composition can be applied to a substrate using various techniques including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous coating composition can be in the range of 1 microns to 5000 microns. The aqueous coating composition can be applied onto a substrate as a single coat for multiple coats. After application, the applied aqueous coating composition is typically allowed to dry at ambient conditions or alternatively dried by the application of heat to provide a dry coating. Drying is typically allowed to proceed under ambient conditions such as, for example, at temperatures of from 0° C. to 50° C.

The aqueous coating composition is suitable for application onto various substrates including processed wood such as medium density fiber board, chip board, and laminates; mineral substrates such as masonry, cement, fiber cement, cement asbestos, plaster, plasterboard, and glazed and unglazed ceramic; metal substrates such as galvanized iron, galvanized steel, cold rolled steel, aluminum, wrought iron, drop forged steel, and stainless steel, previously painted or primed surfaces (fresh, aged or weathered); cellulosic substrates such as paper and paperboard; glass; asphalt; leather; wallboard; nonwoven material; and synthetic substrates such as polyvinyl chloride, polyvinylidene chloride, polyethylene, and polypropylene.

The dried coating film can be subjected to an UV irradiation, as well know in the art, to form crosslinking between the photosensitive aromatic ketones and other components in the film.

The dry coating prepared from the aqueous coating composition is suitable as a protective coating or an aesthetic coating. Example of suitable coatings include architectural coatings such as interior and exterior paint coatings, including masonry coatings, wood coating, cementious coatings and treatments; maintenance coatings such as metal coatings; paper coatings; and traffic coatings such as those coatings used to provide markings on roads, pavements, and runways.

The technical advantages of the aqueous copolymer dispersion and the coating composition thereof are the improvement of short term to long term efficiency for DPUR, without sacrifice the mechanical property of the coating film, without color fade issue, and cost saving by substantively free of hydrophilic aromatic ketones.

In the present specification, the technical features in each preferred technical solution and more preferred technical solution can be combined with each other to form new technical solutions unless indicated otherwise. For briefness, the Applicant omits the descriptions for these combinations. However, all the technical solutions obtained by combing these technical features should be deemed as being literally described in the present specification in an explicit manner.

EXAMPLES

The experimental methods in the examples, when not described in detail, is contemplated to follow normal conditions in the art, for example, handbooks of polymer chemistry, or follow conditions suggested by chemical or instrument manufacturer.

I. Raw Materials

TABLE 1

Starting materials for emulsion copolymer preparation

| Compound | Chemical Nature |
| --- | --- |
| BA | Butyl Acrylate |
| MMA | Methyl Methacrylate |
| MAA | Methacrylic Acid |
| ST | Styrene |
| t-BHP | t-butyl hydroperoxide |
| SSF | Sodium Formaldehyde Sulfoxylate |
| SPS | Sodium persulfate |
| FeSO4 | Ferrous sulfate |
| EDTA | Ethylenediaminetetraacetic acid |
| DBS | sodium dodecyl benzene sulfonate |
| BP | Benzophenone |
| MBB | methyl-2-benzoylbenzoate |
| Proxel ™ GXL | Biocide |

TABLE 2

Starting materials used in aqueous coating formulation

| Material | Function | Chemical nature | Supplier |
| --- | --- | --- | --- |
| Kathon ™ LXE | Biocide | Methyl- and chloroisothiazolinone | Rohm and Haas |
| Rocima ™ 361 | Biocide | Carbendazim and Diuron | Rohm and Haas |
| Natrosol ™ 250 HBR | Thickener | Hydrophobic modified cellulose | Aqualon |
| Propylene Glycol | Solvent | Propylene glycol | |
| Ammonia (28%) | Base | Ammonia | |
| Orotan ™ 731A | Pigment dispersant | Hydrophobic Copolymer | Rohm and Haas |
| Triton ™ CF-10 | Wetting agent | Nonionic surfactant | Union Carbide |
| Tego Foamex ™ 3062 | Defoamer | Silicone-type | Tego |
| Tego Foamex ™ 825 | Defoamer | Silicone-type | Tego |

TABLE 2-continued

Starting materials used in aqueous coating formulation

| Material | Function | Chemical nature | Supplier |
|---|---|---|---|
| Ti-Pure ™ R-902 | Pigment | Titanium dioxide | DuPont |
| CC-700 | Extender | Calcium carbonate | Guangfu Building Materials Group (China) |
| Mineral Spirits | Solvent | Aliphatic solvent | Exxon |

A hydrophilic aromatic ketone H was included in coal ash DPUR tests according to patent application DE4318083A1. The hydrophilic aromatic ketone H was obtained by reacting 4-chloroformylbenzophenone with Pluronic® PE 6400 (ethylene oxide/propylene oxide block copolymer, weight-average molecular weight approximately 2900) in a molar ratio of 2:1 in the presence of triethylamine in toluene at 25° C., removing the triethylamine hydrochloride precipitate, and bringing the filtrate to constant weight under oil pump vacuum.

II. Test Procedures

Coal Ash DPUR Test

The aqueous coating composition was drawn down by a roller stick on asbestos with a wet film thickness of 120 μm as the first layer. This sample was allowed to be in 23° C., 50% relative humidity CTR (consistent temperature room) for 4 hours and then applied with a roller stick with a wet film thickness of 80 μm as the second layer. Then treated this sample in 23° C., 50% relative humidity CTR for 14 days before exposed to 4 hours QUV with UVA-340 nm lamps (QUV Weathering Tester-Model QUV/Spray, Irradiance 0.77 W/m²/nm). Or treated this sample in 23° C., 50% relative humidity CTR for 7 days and 40° C. oven for 3 days before exposed to UVA for 4 hours to imitate the long term exposure.

Premix GB (China national standard) determined ash and DI water with weight ratio of 1:1. Applied this slurry on the coated asbestos and treat it in CTR for 2 hours before rinsed it for 1 minute. Reapplied this slurry and rinsed for 5 cycles. The DPUR was characterized by measuring initial and final value of reflectance Y using a color spectrophotometer (Color-guide sphere spectrophotometer, BYK Gardner). The results were characterized by the level from 1 to 5. 5 is the best, 1 is the worst.

Yellowing Test

Prepared the ready-to-test panels using the same method as Coal Ash DPUR test, then exposed to QUV with UVA-340 nm lamps (QUV Weathering Tester-Model QUV/Spray, Irradiance 0.77 W/m²/nm) 4 hours as the same as Coal Ash DPUR test. Tested CIE b value before and after QUV. If the positive b value increases, the color will become more yellow.

Exposure Test

Applied 15 mil wet film thickness with two layers on the asbestos and exposed to south at a 45° angle in Shanghai, China. The exposure performance was characterized by measuring the initial and final value of reflectance Y (using Color-guide™ sphere spectrophotometer, BYK Gardner). The results were characterized by level from 1 to 5. Level 5 is the best and level 1 is the worst. The color retention performance of color paint was determined by CIE L, a, b value (using Color-guide™ sphere spectrophotometer, BYK Gardner). The results were characterized by level from 1 to 5. Level 5 is the best and level 1 is the worst.

Example 1

Preparation of Aqueous Emulsion Copolymers

A monomer emulsion was prepared by combining 1648.2 g BA, 259.5 g MMA, 32.5 g MAA, 406 g DI Water, and 9.9 g of a 22.5% by wt aqueous solution of DBS, and emulsifying with stirring. Initiator #1 was made by dissolving 5.4 g sodium persulfate in 29 g of water. Initiator #2 was made by dissolving 3.2 g sodium persulfate in 95.3 g of water. A seed latex having a particle size 100 nm was made from BA and MMA. Next, 649 g water in flask was heated to 89° C. To the stirred flask, 1.0 g sodium carbonate in 25 g water, Initiator #1, 4.0 g 20.5% by wt. aqueous ammonium and 96 g seed latex were charged, then the monomer emulsion and initiator #2 were added to reaction flask over a period of about 3 hours. Reactor temperature was maintained at 82° C. After completion of monomer emulsion and initiator #2 feeding, 0.01 g ferrous sulfate, 0.01 g EDTA, 1.40 g of t-butyl hydroperoxide (70% aq.) and 1.66 g of SSF in aqueous solutions were added to the flask. After cooling, the contents of the reactor were neutralized to a pH of 9.0 with aqueous ammonium. 2.9 g of 19% Proxel™ GXL diluted in water were added to the flask.

Example 2

Comparison of Different Aromatic Ketones

The aqueous coating composition was made with a 48VS/40PVC (VS: volume solids) formulation using the aqueous emulsion made in Example 1. The ingredients listed in Table 3 (grind) were mixed using a high speed Cowles disperser. The ingredients listed in Table 3 (let down) were added using a conventional lab mixer (IKA Mixer). Aromatic ketones were added within the polymerization process and copolymer emulsion obtained was added during coating preparation as indicated in Table 3. When making color paint, 2 g colorant (phthalo blue) was added into paint formulation during let-down period.

Example 3

Same coating composition was prepared as Example 2 except that the aromatic ketones of Table 7 were post added during coating preparation.

Example 4

Same coating composition was prepared as Example 2 except that MBB was added during polymerization process and benzophenone was either added during polymerization process (Table 8) or post added during coating preparation (Table 9 for coal ash test and Table 10 for exterior exposure performance).

TABLE 3

| Paint formulation | |
|---|---|
| Material | Weight(g) |
| Grind | |
| Water | 80.0 |
| Propylene glycol | 36.0 |
| Natrosol ™ 250 HBR | 1.0 |
| Ammonia (28%) | 0.8 |

TABLE 3-continued

Paint formulation

| Material | Weight(g) |
|---|---|
| Orotan ™ 731A | 12.48 |
| Triton ™ CF-10 | 1.80 |
| Tego Foamex ™ 3062 | 1.50 |
| Mineral Spirits | 7.0 |
| Rocima ™ 361 | 7.10 |
| Ti-Pure ™ R-902 | 160.0 |
| CC-700 | 256 |

Let down

| | |
|---|---|
| Latex of Example 1 | 385.0 |
| Tego Foamex ™ 825 | 1.0 |
| Kathon ™ LXE | 1.20 |
| Water | 49.12 |
| Total | 1000 |

Paint characteristics

| | |
|---|---|
| Total PVC | 39.96% |
| Volume solids | 47.8% |
| Weight solids | 63.0% |

TABLE 4

Coal Ash DPUR Test (14 days in CTR)

| Aromatic Ketone 1 | | Aromatic Ketone 2 | | DPUR | CIE b before | CIE b after |
|---|---|---|---|---|---|---|
| Code | Level | Code | Level | Performance | UV | UV |
| MBB | 0.50% | BP | 0.10% | 2 | 1.75 | 1.78 |
| H | 0.50% | BP | 0.10% | 2 | 1.78 | 3.25 |
| MBB | 2.00% | BP | 0.60% | 5 | 1.75 | 1.80 |
| H | 2.00% | BP | 0.60% | 5 | 1.80 | 3.40 |

TABLE 5

Coal Ash DPUR Test (7 days in CTR + 3 days in 40° C. oven)

| Aromatic Ketone 1 | | Aromatic Ketone 2 | | DPUR | CIE b before | CIE b after |
|---|---|---|---|---|---|---|
| Code | Level | Code | Level | Performance | UV | UV |
| MBB | 0.50% | BP | 0.10% | 2 | 1.75 | 1.79 |
| H | 0.50% | BP | 0.10% | 1 | 1.78 | 3.43 |
| MBB | 2.00% | BP | 0.60% | 4 | 1.75 | 1.85 |
| H | 2.00% | BP | 0.60% | 3 | 1.80 | 3.56 |

TABLE 6

DPUR and Color Retention Performance after Exterior Exposure

| Aromatic Ketone 1 | | Aromatic Ketone 2 | | 1.5 month | | 12 month | | 22 month | |
|---|---|---|---|---|---|---|---|---|---|
| Code | Level | Code | Level | DPUR | Color retention | DPUR | Color retention | DPUR | Color retention |
| MBB | 0.50% | BP | 0.10% | 3 | 5 | 3 | 4 | 2 | 4 |
| H | 0.50% | BP | 0.10% | 2 | 5 | 2 | 3 | 1 | 2 |
| MBB | 2.00% | BP | 0.60% | 5 | 5 | 4 | 4 | 4 | 4 |
| H | 2.00% | BP | 0.60% | 4 | 5 | 2 | 3 | 1 | 2 |

TABLE 7

Exterior Exposure DPUR Performance

| Aromatic Ketone 1 | | Aromatic Ketone 2 | | DPUR Performance | | | | |
|---|---|---|---|---|---|---|---|---|
| Code | Level | Code | Level | 2 mon. | 6 mon. | 10 mon. | 13 mon. | 17 mon. |
| MBB | 0.50% | BP | 0.60% | 5 | 4 | 2 | 1 | 1 |
| MBB | 1.00% | BP | 0.60% | 5 | 4 | 3 | 2 | 2 |
| MBB | 1.50% | BP | 0.60% | 5 | 4 | 3 | 3 | 3 |
| MBB | 2.00% | BP | 0.60% | 5 | 4 | 3 | 3 | 4 |
| MBB | 3.00% | BP | 2.00% | 5 | 4 | 4 | 4 | 4 |
| MBB | 4.00% | BP | 3.00% | 5 | 5 | 5 | 4 | 4 |

TABLE 8

Coal ash DPUR Test Results (7 days in CTR + 3 days in 40° C. oven)

| Aromatic Ketone 1 | | Aromatic Ketone 2 | | |
|---|---|---|---|---|
| Code | Level | Code | Level | DPUR Performance |
| H | 0.10% | BP | 1.00% | 1 |
| H | 0.10% | BP | 2.00% | 1 |
| MBB | 0.50% | H | 0.00% | 1 |
| MBB | 1.50% | H | 0.00% | 3 |
| MBB | 0.50% | BP | 0.10% | 1 |
| MBB | 1.00% | BP | 0.60% | 2 |
| MBB | 2.00% | BP | 0.60% | 3 |

TABLE 9

Coal ash DPUR Test Results (14 days in CTR)

| Aromatic Ketone 1 | | Aromatic Ketone 2 | | |
|---|---|---|---|---|
| Code | Level | Code | Level | DPUR Performance |
| H | 0.00% | BP | 1.00% | 4 |
| H | 0.00% | BP | 2.00% | 5 |
| MBB | 0.50% | H | 0.10% | 1 |
| MBB | 1.50% | H | 0.10% | 3 |
| MBB | 0.50% | BP | 0.10% | 4 |
| MBB | 1.00% | BP | 0.60% | 4 |
| MBB | 2.00% | BP | 0.60% | 5 |

TABLE 10

Exterior Exposure DPUR Performance

| Aromatic Ketone 1 | | Aromatic Ketone 2 | | DPUR Performance | | | |
|---|---|---|---|---|---|---|---|
| | | | | 2 | 6 | 9 | 12 |
| Code | Level | Code | Level | mon. | mon. | mon. | mon. |
| H | 0.00% | BP | 1.00% | 5 | 3 | 3 | 3 |
| H | 0.00% | BP | 2.00% | 5 | 3 | 3 | 3 |
| MBB | 1.00% | H | 0.00% | 5 | 2-3 | 2 | 2 |
| MBB | 2.00% | H | 0.00% | 5 | 3 | 3 | 3 |
| MBB | 0.50% | BP | 0.60% | 5 | 3 | 3 | 3 |
| MBB | 1.00% | BP | 0.60% | 5 | 3 | 3 | 4 |
| MBB | 2.00% | BP | 0.60% | 5 | 3 | 3 | 4 |

The invention claimed is:

1. An aqueous copolymer dispersion comprising:
an emulsion copolymer, wherein the emulsion copolymer comprises, as a copolymerized unit, based on the dry weight of the copolymer, at least 90 wt % an ethylenically unsaturated nonionic monomer, and up to 10 wt % an ethylenically unsaturated stabilizer monomer, and wherein the emulsion copolymer is not a multi-stage emulsion copolymer comprising at least two stages; and
two hydrophobic aromatic ketones, wherein the aromatic ketones are, based on the dry weight of the copolymer, from 0.6 to 3 wt % benzophenone and from 0.5 to 3 wt % of a benzophenone derivative; and
wherein the dispersion comprises 0 or less than 0.1 wt % hydrophilic aromatic ketone.

2. The aqueous copolymer dispersion of claim 1, wherein the derivative is selected from methyl-2-benzoylbenzoate, 4-hydroxy benzophenone, 4-amino benzophenone, 4-hydrocarboxyl benzophenone, 4-carboxymethyl benzophenone and 3-nitro benzophenone.

3. The aqueous copolymer dispersion of claim 2, wherein the derivative is methyl-2-benzoylbenzoate.

4. The aqueous copolymer dispersion of claim 3, wherein the amount of methyl-2-benzoylbenzoate in the dispersion ranges from 1 to 3 wt %.

5. The aqueous copolymer dispersion of claim 3, wherein the dispersion comprises from 0.6 to 2 wt % benzophenone and from 1 to 3 wt % methyl-2-benzoylbenzoate.

6. The aqueous copolymer dispersion of claim 1, wherein the emulsion copolymer further comprises, as a copolymerized unit, based on the dry weight of the copolymer, up to 5 wt % of allyl methacrylate, diallyl phthalate, 1,4-butylene glycol dimethacrylate, 1,2-ethylene glycol dimethacrylate, 1,6-hexanediol diacrylate or divinyl benzene.

7. An aqueous coating composition comprising:
an emulsion copolymer, two hydrophobic aromatic ketones, and a coating adjuvant,
wherein the aromatic ketones are, based on the dry weight of the copolymer, from 0.6 to 3 wt % benzophenone and from 0.5 to 3 wt % of a benzophenone derivative;
wherein the emulsion copolymer comprises, as a copolymerized unit, based on the dry weight of the copolymer, at least 90 wt % an ethylenically unsaturated nonionic monomer, and up to 10 wt % an ethylenically unsaturated stabilizer monomer, and wherein the emulsion copolymer is not a multi-stage emulsion copolymer comprising at least two stages; and
wherein the coating composition comprises 0 or less than 0.1 wt % hydrophilic aromatic ketone.

8. The aqueous coating composition of claim 7, wherein the derivative is selected from methyl-2-benzoylbenzoate, 4-hydroxy benzophenone, 4-amino benzophenone, 4-hydrocarboxyl benzophenone, 4-carboxymethyl benzophenone and 3-nitro benzophenone.

9. The aqueous coating composition of claim 8, wherein the derivative is methyl-2-benzoylbenzoate.

10. An aqueous copolymer dispersion comprising:
an emulsion copolymer; and
two hydrophobic aromatic ketones, wherein the aromatic ketones are, based on the dry weight of the copolymer, from 0.6 to 3 wt % benzophenone and from 0.5 to 3 wt % of a benzophenone derivative, wherein the dispersion comprises 0 or less than 0.1 wt % hydrophilic aromatic ketone, and
wherein a coating film made from the aqueous copolymer dispersion exhibits a CIE delta b of less than or equal to 0.10 after:
exposure for 7 days to 23° C. and 50% relative humidity;
exposure for 3 days to 40° C.;
exposure for 4 hours to UV light having an irradiance of 0.77 W/m$^2$/nm in a QUV Weathering Tester, Model QUV, with UVA-340 nm lamps;
application of Premix GB (China national standard coal ash slurry in water) to the coating and exposure for 2 hours to 23° C. and 50% relative humidity followed by a rinse with deionized water; and
repeat of the coal slurry application and rinse four times.

11. The aqueous copolymer dispersion of claim 10, wherein the derivative is selected from methyl-2-benzoylbenzoate, 4-hydroxy benzophenone, 4-amino benzophenone, 4-hydrocarboxyl benzophenone, 4-carboxymethyl benzophenone and 3-nitro benzophenone.

12. The aqueous copolymer dispersion of claim 11, wherein the derivative is methyl-2-benzoylbenzoate.

13. The aqueous copolymer dispersion of claim 12, wherein the amount of methyl-2-benzoylbenzoate in the dispersion ranges from 1 to 3 wt %.

14. The aqueous copolymer dispersion of claim 12, wherein the dispersion comprises from 0.6 to 2 wt % benzophenone and from 1 to 3 wt % methyl-2-benzoylbenzoate.

15. The aqueous copolymer dispersion of claim 10, wherein the emulsion copolymer further comprises, as copolymerized unit, based on the dry weight of the copolymer, up to 5 wt % of allyl methacrylate, diallyl phthalate, 1,4-butylene glycol dimethacrylate, 1,2-ethylene glycol dimethacrylate, 1,6-hexanediol diacrylate or divinyl benzene.

* * * * *